Feb. 27, 1962

E. F. JOHNSTON 3,022,806

ROUTER DUST GUARD

Filed Jan. 13, 1960

Elmer F. Johnston
INVENTOR.

BY *Clarence A. O'Brien*
*and Harvey B. Jacobson*
Attorneys

Feb. 27, 1962

E. F. JOHNSTON 3,022,806

ROUTER DUST GUARD

Filed Jan. 13, 1960

Elmer F. Johnston
INVENTOR.

3,022,806
ROUTER DUST GUARD
Elmer F. Johnston, 3114 California St., Oakland, Calif.
Filed Jan. 13, 1960, Ser. No. 2,278
2 Claims. (Cl. 144—252)

This invention relates to attachments for power tools and more particularly to a dust guard for a router.

An object of the invention is to provide a practical very simple attachment for a conventional router to materially reduce, if not completely eliminate the dust and chips which are thrown about in the use of a conventional router.

A router is a particularly "dirty" woodworking tool in the sense that it causes a large amount of dust, wood chips and splinters to be thrown about as the router is used. The guards in accordance with the invention correct this problem by accumulating the vast majority of the dust, chips, splinters, etc. and withdrawing them by means of vacuum applied in the region of the body of the router.

Briefly, the invention is embodied in an attachment or attachments which are capable of being applied to a conventional router without in any way altering the efficiency and function of the router. The attachment or attachments have a cavity through which air is drawn by means of the application of vacuum, for instance, by an ordinary vacuum cleaner hose. In this way, there is no scattering of a great profusion of dust and other by-products of the router operation.

Although dust guards have been conceived of in the past, it is believed that no one has ever attempted to improve router operation by means of a dust guard specially configured and designed for use with a router.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
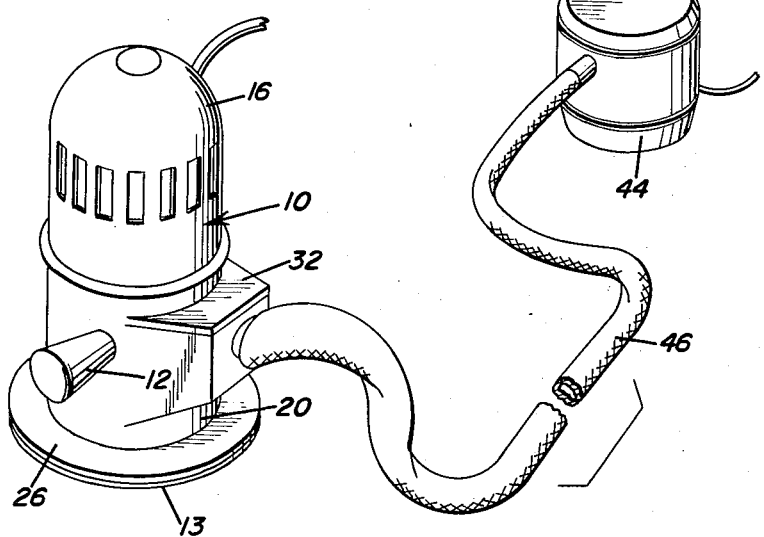
FIGURE 1 is a perspective view of a conventional router equipped with a dust guard in accordance with the invention.
Figure 1:
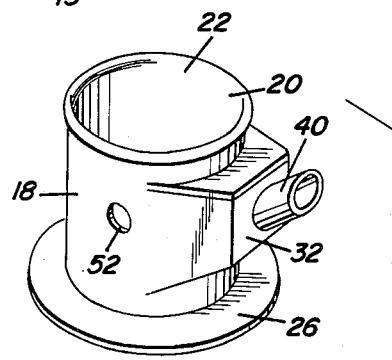

In the accompanying drawings there is an illustration of a conventional router 10 having handles 12 and 14 secured to the router housing 16. Inasmuch as dust guard 18 for the router attaches to the housing of the router, the motor, switch, blade and other operating parts of the router are not shown. These parts are conventional and unaltered by the presence of guard 18.

The guard 18 is made of a sleeve 20 having an open upper end 22 and an open lower end 24. The sleeve is preferably cylindrical and fits flush on the outer surface of housing 18, occupying approximately one-half of the outer surface at the lower part thereof. Laterally projecting collar 26 is secured to the lower edge of sleeve 20 and is adapted to fit over the lower router flange 13 at the lower part of router housing 16.

A dust accumulating pocket 30 is formed in sleeve 26 by means of a small case 32 confronting an opening 34 in the side wall of sleeve 20. The case has an outer wall 36 which is also provided with an opening 38, and there is a collar 40 attached to wall 36 and registered with opening 38. The case 32 fits over the discharge opening 15 in router housing 16 whereby the pocket 30 is in direct communication with opening 15.

A source of suction, for example, a vacuum cleaner 44 is operatively connected with pocket 30 by way of vacuum cleaner hose 46 and attached to collar 40. When the vacuum cleaner 44, diagrammatically representing any source of suction, is in operation, air is withdrawn from router opening 15 and pulled through pocket 30, the bore of collar 40 and hose 46. This withdraws all chips, dust, etc. from the operating region of the router. As shown in the drawings it is preferred that the attachment be made of plastic material in order to maintain cost minimal and so that it may be made very light in weight. The dust guard may be held in place on the form of router illustrated, by simply having a pair of apertures 52 in the side wall of sleeve 20 so that handles 12 and 14 may extend therethrough in order to engage in threaded apertures 17 of housing 16.

Figure 5:
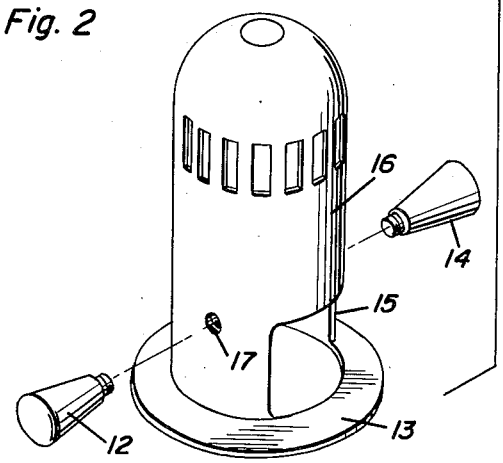
FIGURE 5 (Sheet 1) is a small scale perspective view showing a modification of the guard.
Figure 3:
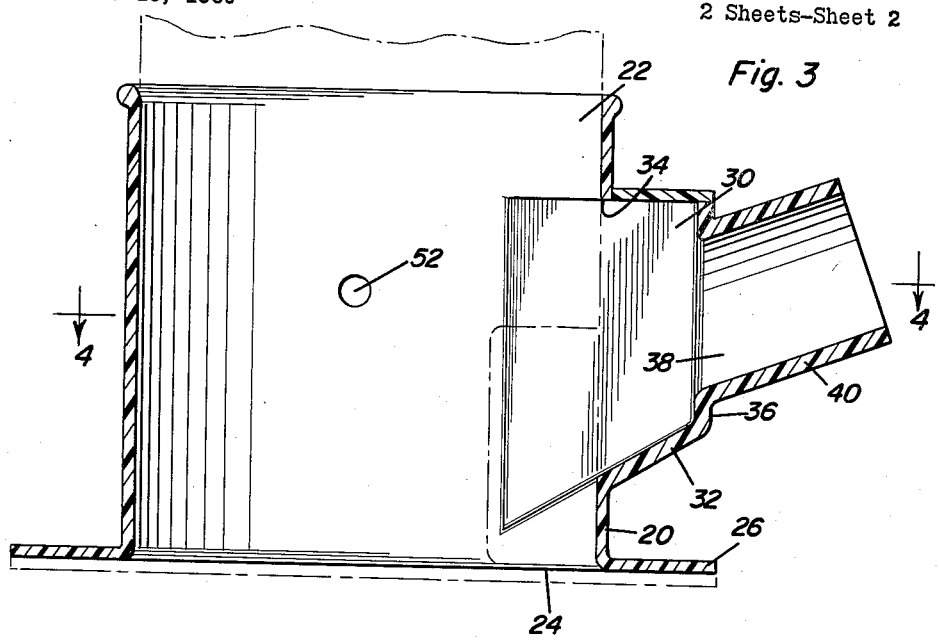
FIGURE 3 is a sectional view of the guard shown in FIGURE 2.
Figure 4:
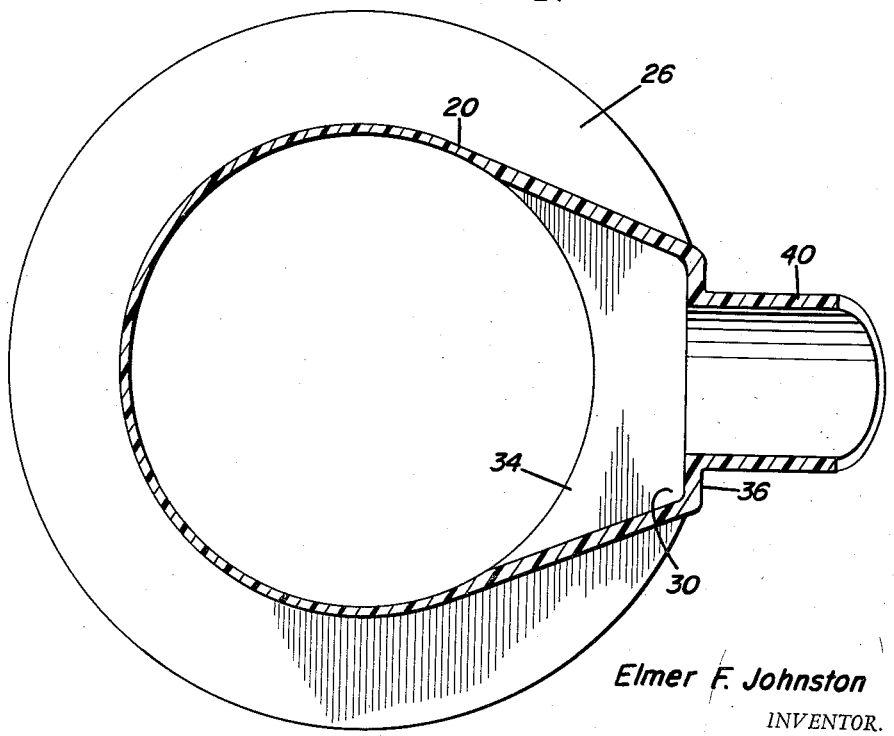
FIGURE 4 is a transverse sectional view taken on the line 4—4 of FIGURE 3.

The dust guard 60 shown in FIGURE 5 is a modification of the dust guard 16. Instead of being made of one piece, it is composed of two sections 62 and 64 which may be bolted or otherwise secured directly to the router housing 16. Section 62 would serve merely to blank or cover one of the openings 15 in the illustrated form of router housing 16, and the other section 64 is the suction section. It has a case 32a essentially identical to case 32 and defining a pocket similar in construction and function to pocket 30. A collar 40a is secured to the front wall of the router case 32 and is adapted to be connected with a source of vacuum, for instance, hose 46.

Figure 2:
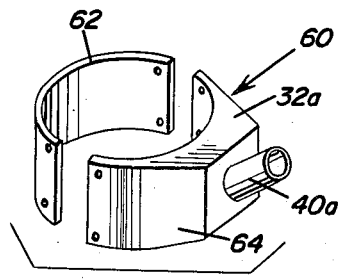
FIGURE 2 is an exploded perspective view of a portion of a router and a portion of the guard shown in FIGURE 1.

After both sections 62 and 64 are attached, for instance, by being screwed or bolted, to the router housing 16, one of the openings 15 is covered by section 62 and the other opening 15 (FIGURE 2) is in direct communication with the pocket of case 32a so that the dust, chips, etc. are withdrawn as they are generated by conventional use of the router.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a conventional router which has a housing having dust discharge openings, a dust guard adapted to be connected with a source of vacuum, said dust guard comprising a sleeve having an open upper end and an open lower end and slidably fitting over a lower portion of the router housing about the router opening in the router housing for easy assembly and disassembly thereon, a case connected with said sleeve and defining a pocket which is in registry with one of said openings, a means connected with said case by which to attach a source of vacuum so that the dust created by normal operation of the router may be withdrawn through said pocket by the action of the suction applied to said case, said sleeve being made of one piece and having apertures therein through which the handles of the conventional router are adapted to pass for rotatively locking the sleeve to the router housing.

2. The subject matter of claim 1 wherein the router has a lower lateral flange and the lower end of said sleeve has a laterally projecting flange adapted to seat upon said lower lateral flange of the router.

References Cited in the file of this patent

UNITED STATES PATENTS

| | | |
|---|---|---|
| 994,430 | Tunks | June 6, 1911 |
| 2,339,324 | Fischer | Jan. 18, 1944 |
| 2,553,924 | Liffquist | May 22, 1951 |
| 2,852,051 | Bickner | Sept. 16, 1958 |